(12) United States Patent
Goeken

(10) Patent No.: US 6,549,144 B1
(45) Date of Patent: Apr. 15, 2003

(54) PORTABLE ELECTRONIC ACTIVATION DEVICE

(75) Inventor: John D. Goeken, Plainfield, IL (US)

(73) Assignee: Goeken Group Corporation, Naperville, IL (US)

( * ) Notice: Subject to any disclaimer, the term of this patent is extended or adjusted under 35 U.S.C. 154(b) by 0 days.

(21) Appl. No.: 09/487,384

(22) Filed: Jan. 18, 2000

(51) Int. Cl.[7] ................................................. H04Q 1/00
(52) U.S. Cl. .................. 340/825.69; 455/574; 455/343; 320/115; 340/693.4
(58) Field of Search ........................... 340/693.1, 693.2, 340/693.3, 693.4, 825.69; 370/311; 455/343, 574, 461, 462; 365/1; 320/113, 114, 115

(56) References Cited

U.S. PATENT DOCUMENTS

| | | | | |
|---|---|---|---|---|
| 3,582,921 A | * | 6/1971 | Krieger | 340/693.1 |
| 4,277,837 A | * | 7/1981 | Sstuckert | 340/825.69 |
| 4,511,761 A | * | 4/1985 | Yamazaki et al. | 455/573 |
| 4,578,586 A | * | 3/1986 | Preston | 340/693.1 |
| 4,728,949 A | * | 3/1988 | Platte | 340/825.69 |
| 4,731,814 A | * | 3/1988 | Becker et al. | 455/574 |
| 4,755,883 A | * | 7/1988 | Uehira | 340/825.69 |
| 4,760,547 A | * | 7/1988 | Duxbury | 455/343 |
| 5,357,244 A | * | 10/1994 | van Zijl | 455/343 |
| 6,011,471 A | * | 1/2000 | Huang | 340/825.69 |
| 6,138,029 A | * | 10/2000 | Diagabel | 455/343 |
| 6,138,918 A | * | 10/2000 | Tarouriech | 340/825.69 |

FOREIGN PATENT DOCUMENTS

| | | | | |
|---|---|---|---|---|
| JP | 362075991 | * | 4/1987 | 365/1 |
| JP | 404011178 | * | 1/1992 | 340/FOR 110 |

* cited by examiner

Primary Examiner—Brian Zimmerman
(74) Attorney, Agent, or Firm—Barnes & Thornburg

(57) ABSTRACT

A portable remote activation device having an exceptionally long battery life. The activation device is composed of a receiver unit and a transmitter unit which are normally connected in tandem. The receiver unit includes a receiver, a battery source for powering the receiver, and a switch for activating the receiver by the battery. The receiver unit also includes a transmitter unit housing which is shaped to accommodate the transmitter unit and, with the transmitter unit so-accommodated, actuate the switch to disconnect battery power from the receiver. Only when the transmitter unit is removed from the receiver unit is the switch closed to connect the battery to the receiver, enabling the receiver to receive signals from the transmitter unit.

11 Claims, 1 Drawing Sheet

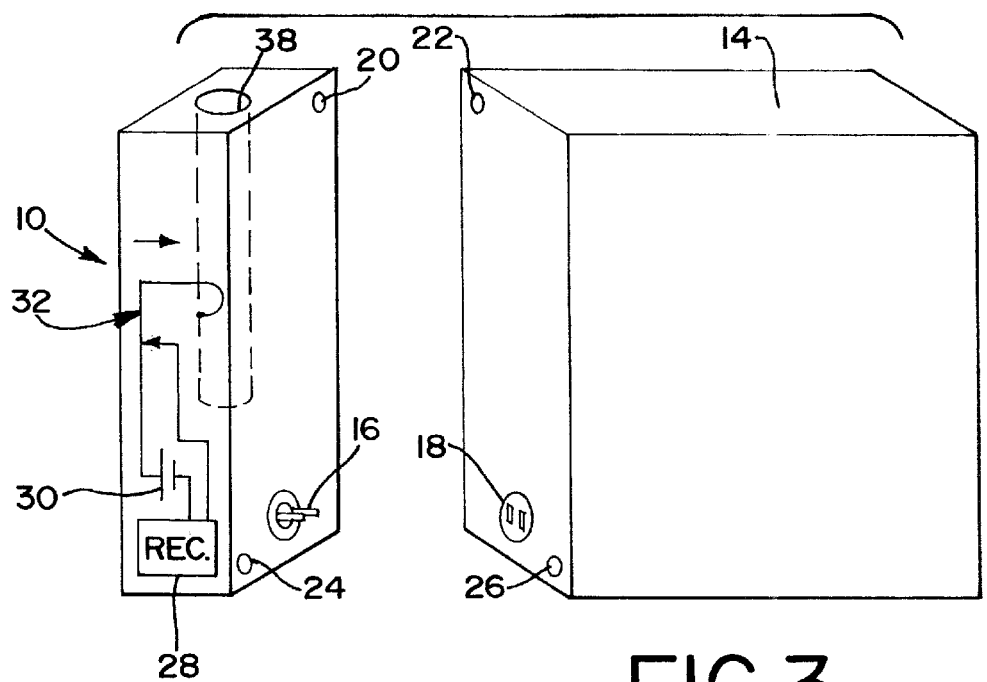
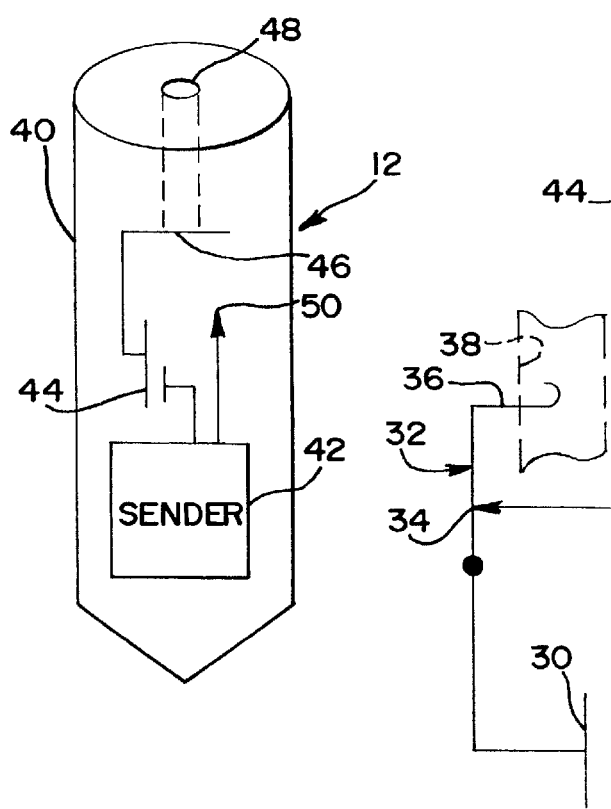
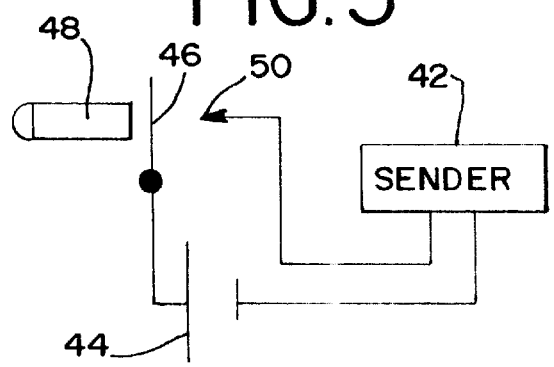
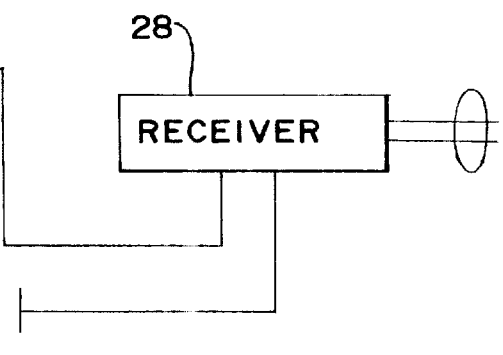

PORTABLE ELECTRONIC ACTIVATION DEVICE

BACKGROUND OF THE INVENTION

This invention relates to portable electronic activation devices such as a remote control, and in particular to a portable electronic activation device having a receiver unit that remains unactivated until a transmitter unit is separated from the receiver unit, at which time the receiver unit is activated to a standby mode to receive signals from the transmitter unit.

In the typical control of an electronic device by a remote transmitter, the electronic device includes a receiver which is energized continuously in order to be able to receive signals from the transmitter. Most such transmitters are battery powered, since the transmitter is activated for only a short period of time, while the receivers are powered by line-current or a large, high capacity battery, since they must be continuously activated. Examples include remote locking/unlocking devices for vehicles, remote controls for televisions and electronic equipment, remote-activated burglar alarms, and the like. In all such devices, the receiver is normally not portable, either because it is connected to line current or includes such a large battery that portability is not readily feasible.

In the past, it has been impossible to provide a remote control for a portable device, because of the lack of capacity of the battery for the portable device. If the receiver of the portable device is activated continuously, even for the most efficient receiver unit, stored energy in the battery is quickly exhausted, and the remote control becomes useless until the battery is either replaced or recharged. If the receiver includes a switch to turn it on, battery power can be conserved, but a signal from the transmitter unit cannot be received until the receiver unit is switched on. Thus, the portable unit has limited utility, either because it is not activated continuously, or because, once activated, it has only a very limited battery life.

SUMMARY OF THE INVENTION

The present invention overcomes the drawbacks of the prior art by providing an electronic activation device having a receiver unit which is always activated only when receipts of signals from a transmitter unit is desired. The receiver unit includes a receiver, a power source for the receiver, and a control for electrically connecting the power source to the receiver for activating the receiver. The transmitter unit includes a transmitter for sending signals to the receiver. The receiver unit also includes a transmitter unit housing which is shaped to accommodate at least a portion of the transmitter unit, with the control being actuated by the transmitte unit when in the housing to prevent connection of the power source to the receiver.

In accordance with the preferred form of the invention, the housing comprises a receptacle in the receiver unit, and the transmitter unit is shaped to fit within the receptacle. In the form of the invention depicted, the receptacle is cylindrical, and the transmitter unit is generally cylindrical, as well.

In the preferred form of the invention, the control includes a normally closed contact, and means is provided in the receiver unit to open the contact when the transmitter unit is located in the receptacle. Preferably, the means to open the contact comprises a switch arm extending into the receptacle and being connected to the contact, with the switch arm being displacable by the transmitter unit when the transmitter unit is located in the receptacle.

Preferably, the receiver unit is a modular unit which can be connected to another device to activate that device. In this form of the invention, means is provided for activating the attached device, that means comprising a plug which is engagable with a receptacle in the attached device. In this manner, the electronic activation device according to the invention can be used, or not, by simply plugging it into another device and then using the remote control feature of the electronic activation device.

In accordance with the invention, the transmitter unit, in addition to its transmitter, also includes a power source and a switch for electrically connecting the power source to the transmitter to activate the transmitter for sending signals to the receiver. The switch is a normally open switch, and includes a push button for closing the switch to activate the transmitter. The power source comprises a battery with enough stored energy to power the transmitter to send activation signals over a desired distance to the receiver.

BRIEF DESCRIPTION OF THE DRAWING

The invention is described in greater detail in the following description of examples embodying the best mode of the invention, taken in conjunction with the drawing figures, in which:

FIG. 1 is a schematic representation of a receiver unit according to the invention, when used in connection with a device to which the receiver unit is to be attached for activation of that device, FIG. 2 is an enlarged schematic illustration of a transmitter unit of the activation device according to the invention, FIG. 3 is an electrical schematic for the transmitter unit of FIG. 2, and FIG. 4 is an electrical schematic for the receiver unit shown in FIG. 1.

DESCRIPTION OF EXAMPLES EMBODYING THE BEST MODE OF THE INVENTION

An electronic activation device according to the invention is depicted in FIGS. 1 and 2. The electronic activation device comprises two basic elements, a receiver unit 10 and a transmitter unit 12. The electronic activation device is fully portable, and therefore both the receiver unit 10 and the transmitter unit 12 have battery power sources.

In FIG. 1, the receiver unit 10 is shown in combination with a device 14 that the receiver unit is designed to activate, such as a portable alarm, a global positioning device, or any other type of apparatus which is to be activated by the receiver unit 10. Accordingly, the receiver unit 10 includes a plug 16 engagable with a receptacle 18 in the device 14, so that when the receiver unit 10 is activated, that activation can then activate or enable the device 14 in a conventional fashion. The receiver unit 10 and the device 14 may also include aligned holes 20, 22 and 24, 26 so that the receiver unit 10 can be bolted or otherwise attached to the device 14 in a conventional fashion.

The receiver unit 10 includes a receiver 28, a power source 30 in the form of a battery connected for activating the receiver 28, and a control 32 in the form of a switch for electrically connecting the power source 30 to the receiver 28 for activating the receiver 28. As best illustrated in FIG. 4, the control 32 includes a normally closed contact 34, with a switch arm 36 extending from the control 32 into a cylindrical receptacle 38 in the receiver unit 10. When the contact 34 is closed as illustrated in FIGS. 1 and 4, the receiver 28 is powered to receive signals from the transmitter unit 12.

The transmitter unit 12 is shaped to conform to the cylindrical receptacle 38. The transmitter unit 12 includes a cylindrical, plug-like body 40 within which is located a transmitter 42 for sending signals to the receiver 28, a power source 44 in the form of a battery for powering the transmitter 42, and a normally-open switch 46 for electrically connecting the power source 44 to the transmitter 42. A push button 48, or similar device, is located proximate the switch 46. When the push button 48 is depressed, the switch 46 closes on a contact 50, energizing the transmitter 42. Thus, the transmitter 42 is normally not activated until the push button 48 is depressed, conserving the energy of the battery power source 44. The power source 44 thus typically has a very long life.

When the transmitter unit 12 is inserted in the receptacle 38, the body 40 engages the switch arm 36, pivoting the control 32 away from the contact 34 (to the left in FIGS. 1 and 4), thus preventing the battery power source 30 from activating the receiver 28. Therefore, when the transmitter unit 12 is installed in the receiver unit 10, the receiver 28 is not activated.

However, when the transmitter unit 12 is removed from the cylindrical receptacle 38 of the receiver unit 10, the control 32 returns to its normally-closed orientation with the contact 34 closed. The receiver 28 is then activated, and is able to receive signals from the transmitter 42 upon depression of the push button 48 to close the contact 50.

Although the control 32 is depicted as a mechanical switch which is physically opened or closed by manipulation of the transmitter unit 12, other, equivalent devices can be employed. For example, the control 32 can be a magnetic switch, operated by a magnetic control in the transmitter unit 12. When the transmitter unit 12 is installed in the receptacle 38, the magnetic switch would be opened, but when the transmitter unit 12 is withdrawn from the receptacle 38, the magnetic switch would be closed. Other types of switches, having the same operational features as described above, can also be employed.

While the tandem combination of the receiver unit 12 and the transmitter unit 14 is depicted and described as a plug-like body 40 installed in a conforming cylindrical receptacle 38, other conforming shapes such as square, rectangular, oblong and the like can be used, as well. Also, any other means of housing of the transmitter unit 12 in the receiver unit 10 can be employed, as well. For example, the transmitter unit 12 can be secured to the exterior of the receiver unit 10, so long as the two units are separable and so long as when the two units are together, the control 32 is opened, but closes as soon as the two units are separated.

The transmitting power of the transmitter unit 12 and the receiving ability of the receiver unit 10 will depend on the size and nature of use of the two units. The units can be constructed so that transmission over a very short distance, such as several meters, might be adequate, or the transmission distance can be much greater.

The transmitter unit 12 and the receiver unit 10 are not connected to one another, so that the transmitter unit 12 is truly portable. The type of transmitter 42 and receiver 28 is not part of the present invention, and current transmitters and receivers include radio frequency, audio, sub-audio and infrared. Other types of transmitters/receiver combinations can be employed, so long as the transmitter unit 12 can be separated from, and removed a desired distance away from, the receiver unit 10.

Because the receiver unit 10 is battery operated, unless the control 32 is held open by the transmitter unit 12, the battery power source 30 would have a relatively short life. With the transmitter unit 12 housed in the receiver unit 10, however, the battery power source 30 is not drained by connection to the receiver 28, and therefore has an extremely long life. Accordingly, unlike prior art receiver units, the receiver unit 10 can be truly modular and portable, being powered by a small battery power source 30 rather than line current or a large storage battery. Either would render the receiver unit 10 unportable.

Various changes can be made to the invention without departing from the spirit thereof or scope of the following claims.

What is claimed is:

1. An electronic activation device, comprising
   a. a receiver unit, said receiver unit including a receiver, a power source for said receiver, and a control for electrically connecting said power source to said receiver for activating same,
   b. a transmitter unit including a transmitter for sending signals to said receiver, said transmitter unit including a power source for said transmitter and a switch for electrically connecting said power source to said transmitter for activating same, and
   c. a transmitter unit housing in said receiver unit shaped to accommodate at least a portion of said transmitter unit, said control being actuated by said transmitter unit to prevent connection of said power source to said receiver when said transmitter unit is in said housing.

2. An electronic activation device according to claim 1 in which said housing comprises a receptacle, said transmitter unit being shaped to fit within said receptacle.

3. An electronic activation device according to claim 2 in which said control includes a normally closed contact, and having means to open said contact when said transmitter unit is in said receptacle.

4. An electronic activation device according to claim 3 in which said means to open comprised a switch arm extending into said receptacle and being connected to said contact, said switch arm being displaced by said transmitter unit when in said receptacle.

5. An electronic activation device according to claim 1 in which said receiver unit is modular and includes means for activating an attached unit.

6. An electronic activation device according to claim 5 in which said activating means comprises a plug engagable with a receptacle in the attached unit.

7. An electronic activation device according to claim 1 in which said switch is a normally open switch.

8. An electronic activation device according to claim 7 including a push button for closing said switch.

9. An electronic activation device according to claim 1 in which said power source comprises a battery.

10. A method of arming a receiver unit of an electronic activation device to receive activation signals from a transmitter unit of the electronic activation device, the receiver unit including a control for electrically connecting a power source to a receiver of the receiver unit, and the transmitter unit including a transmitter and a power source for said transmitter and a switch for electrically connecting said power source to said transmitter for activating same, the method comprising the steps of:
   a. attaching the transmitter unit to the receiver unit so that the control prevents connection of the power source to the receiver while the transmitter unit is attached to the receiver unit, and b. removing the transmitter unit from the receiver unit so that the control connects the power source to the receiver.

11. The method according to claim 10 including the further step of activating the receiver by causing the transmitter unit, when removed from the receiver unit, to send a signal to the receiver unit.

* * * * *